United States Patent
Heisler, Jr. et al.

(10) Patent No.: US 11,227,459 B2
(45) Date of Patent: *Jan. 18, 2022

(54) APPARATUS AND METHOD FOR A BALCONY ACCESS STATUS ALERT SYSTEM

(71) Applicant: Jerome S. Heisler, Jr., Chadds Ford, PA (US)

(72) Inventors: Jerome S. Heisler, Jr., Chadds Ford, PA (US); Joshua B. Heisler, Chadds Ford, PA (US)

(73) Assignee: Jerome S. Heisler, Jr., Chadds Ford, PA (US)

(*) Notice: Subject to any disclaimer, the term of this patent is extended or adjusted under 35 U.S.C. 154(b) by 101 days.

This patent is subject to a terminal disclaimer.

(21) Appl. No.: 16/852,957

(22) Filed: Apr. 20, 2020

(65) Prior Publication Data

US 2020/0242870 A1    Jul. 30, 2020

Related U.S. Application Data

(63) Continuation of application No. 16/741,076, filed on Jan. 13, 2020, now Pat. No. 10,665,048, which is a
(Continued)

(51) Int. Cl.
*G07C 9/29* (2020.01)
*G08B 13/08* (2006.01)
(Continued)

(52) U.S. Cl.
CPC .......... *G07C 9/29* (2020.01); *E04G 21/3233* (2013.01); *G07C 9/00896* (2013.01); *G08B 7/06* (2013.01);
(Continued)

(58) Field of Classification Search
CPC .............. G07C 9/29; G07C 9/00896; G07C 2009/00769; G07C 2209/62;
(Continued)

(56) References Cited

U.S. PATENT DOCUMENTS 4,231,030 A    10/1980 Weiss
4,281,320 A     7/1981 Rosenberg
(Continued)

FOREIGN PATENT DOCUMENTS

AU    2016101671       10/2016
AU    2016101671 A4 * 10/2016
(Continued)

OTHER PUBLICATIONS

"DMP Two-way Wireless System Offers a Competitive Edge", Digital Monitoring Products, White Paper, 2014.
(Continued)

*Primary Examiner* — Brian Wilson
(74) *Attorney, Agent, or Firm* — Caesar Rivise, PC

(57) ABSTRACT

An automatic alert system pertaining to a gate that is releasably secured across an ingress/egress to a balcony or other elevated platform. The gate has a pair of vertical posts that are releasably secured within respective boots secured to the floor. One of the boots includes a switch-activated transmitter that is activated when its respective post is removed from the boot. Another switch-activated transmitter is activated whenever the gate is opened. If the post is pulled out of the boot, or the gate is opened, the switch-activated transmitters transmit a wireless signal to a transceiver located on the gate which then transmits a signal to an on-site controller that transmits respective text messages to authorized personnel informing them of the gate removal/opening and will continue to do so until the gate status changes. The transceiver may be housed within a housing
(Continued)

that also contains a visual and/or audible warning at the gate vicinity to warn those in the vicinity of the gate removal or opening.

10 Claims, 12 Drawing Sheets

Related U.S. Application Data continuation-in-part of application No. 16/278,471, filed on Feb. 18, 2019, now Pat. No. 10,565,812, which is a continuation of application No. 16/111,670, filed on Aug. 24, 2018, now Pat. No. 10,249,118, which is a continuation of application No. 15/865,406, filed on Jan. 9, 2018, now Pat. No. 10,083,557, which is a continuation-in-part of application No. 15/497,975, filed on Apr. 26, 2017, now Pat. No. 9,898,905.

(51) Int. Cl.
| | | |
|---|---|---|
| *E04G 21/32* | (2006.01) | |
| *H04W 4/12* | (2009.01) | |
| *H04W 4/021* | (2018.01) | |
| *G08B 7/06* | (2006.01) | |
| *G07C 9/00* | (2020.01) | |
| *G08B 21/02* | (2006.01) | |

(52) U.S. Cl.
CPC ............ *G08B 13/08* (2013.01); *H04W 4/021* (2013.01); *H04W 4/12* (2013.01); *G07C 2009/00769* (2013.01); *G08B 21/02* (2013.01)

(58) Field of Classification Search
CPC . G07C 9/00119; E04G 21/3233; E04G 21/32; E04G 21/3204; E04G 21/3223; E04G 21/3228; E04G 2021/3257; H04W 4/12; H04W 4/021; G08B 13/08; G08B 7/06; G08B 21/02; G08B 13/02; G08B 13/06; G08B 13/10; G08B 13/14; H04L 12/2823
See application file for complete search history.

(56) References Cited

U.S. PATENT DOCUMENTS

| | | | |
|---|---|---|---|
| 4,644,329 A | 2/1987 | Brueske | |
| 4,870,404 A | 9/1989 | Husmann et al. | |
| 5,334,971 A | 8/1994 | Raath | |
| 5,900,815 A | 5/1999 | Story | |
| 6,186,274 B1 | 2/2001 | Reynolds et al. | |
| 6,575,435 B1* | 6/2003 | Kotzen | ...................... E04H 4/06 |
| | | | 160/10 |
| 6,710,717 B2 | 3/2004 | Slomowitz et al. | |
| 8,256,164 B2 | 9/2012 | Cuccurullo | |
| 8,502,665 B2 | 8/2013 | Boudreau | |
| 8,522,487 B2 | 9/2013 | Whiting et al. | |
| 9,898,905 B1 | 3/2018 | Heisler | |
| 10,083,557 B1 | 9/2018 | Heisler | |
| 10,249,118 B2 | 4/2019 | Heisler, Jr. | |
| 10,565,812 B2 | 2/2020 | Heisler, Jr. | |
| 2005/0024207 A1 | 2/2005 | Schebel et al. | |
| 2009/0044450 A1 | 2/2009 | Hallman | |
| 2010/0171085 A1 | 7/2010 | Webster, IV | |
| 2011/0057788 A1 | 3/2011 | Talkington et al. | |
| 2012/0255234 A1* | 10/2012 | Wang | ...................... E05C 19/16 |
| | | | 49/395 |
| 2012/0262289 A1 | 10/2012 | French, II et al. | |
| 2013/0257611 A1* | 10/2013 | Lamb | ..................... G08B 13/02 |
| | | | 340/501 |
| 2015/0109104 A1 | 4/2015 | Fadell et al. | |
| 2016/0253894 A1 | 9/2016 | Pignolet et al. | |

FOREIGN PATENT DOCUMENTS

| | | |
|---|---|---|
| CN | 203614000 U | 5/2014 |
| CN | 104747049 | 7/2015 |
| EP | 1988245 | 5/2008 |
| EP | 2224266 | 2/2010 |

OTHER PUBLICATIONS

English Abstract of CN 104747049.
English Abstract of CN203614000U.
"Model 1106 Universal Transmitter", Digital Monitoring Products, https://buy.dmp.com/dmp/Shop?DSP=30100&PCR=1:100:10012:10119 &IID=1106-W, Jan. 25, 2017.
"Tech Support FAQ", Digital Monitoring Products, Jan. 25, 2017.

* cited by examiner

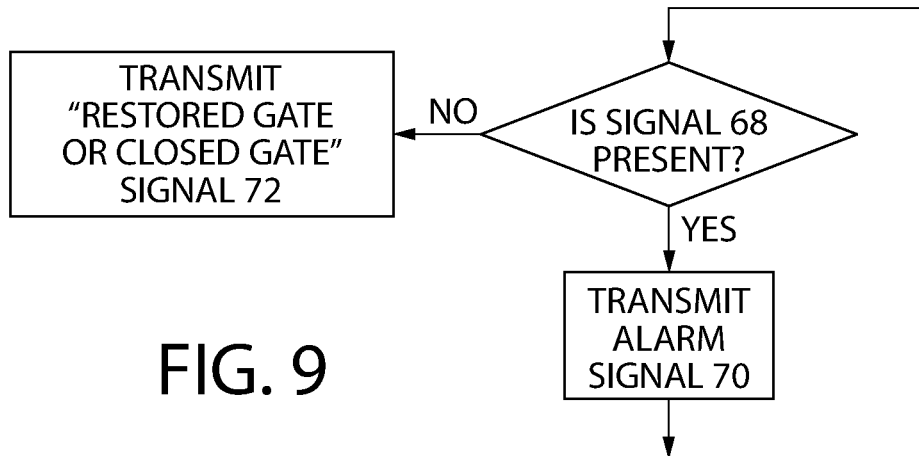
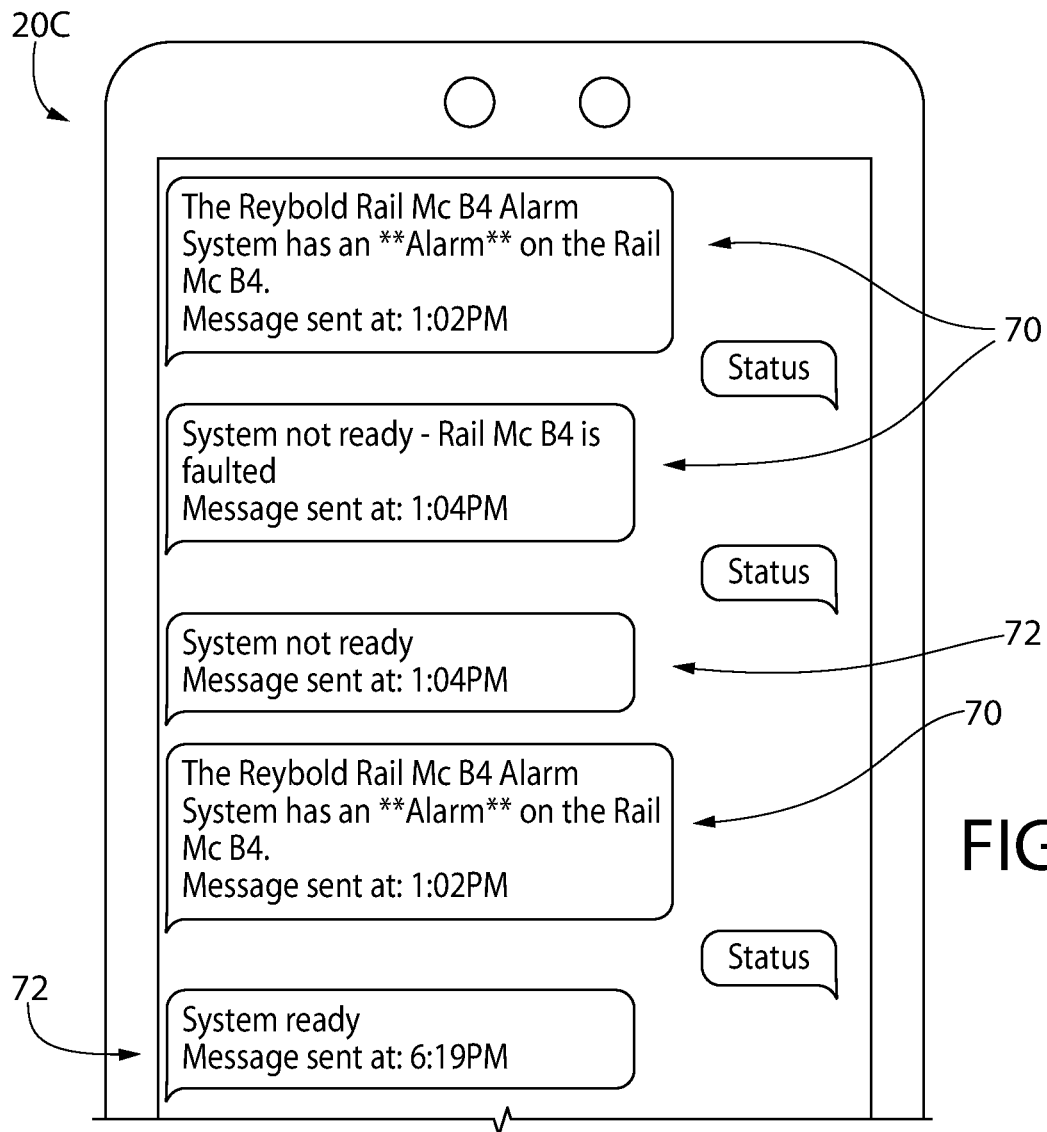

APPARATUS AND METHOD FOR A BALCONY ACCESS STATUS ALERT SYSTEM

CROSS-REFERENCE TO RELATED APPLICATIONS

This Continuation application claims the benefit under 35 U.S.C. § 120 of A.S.N. 16/741,076 filed Jan. 13, 2020 which in turn is a Continuation-in-Part application that claims the benefit under 35 U.S.C. § 120 of application Ser. No. 16/278,471 filed on Feb. 18, 2019 which in turn is a Continuation application that claims the benefit under 35 U.S.C. § 120 of application Ser. No. 16/111,670 filed on Aug. 24, 2018 (now U.S. Pat. No. 10,249,118) which in turn is a Continuation application which claims the benefit under 35 U.S.C. § 120 of application Ser. No. 15/865,406 filed on Jan. 9, 2018 (now U.S. Pat. No. 10,083,557) which in turn is a Continuation-in-Part application and claims the benefit under 35 U.S.C. § 120 of application Ser. No. 15/497,975 filed on Apr. 26, 2017 (now U.S. Pat. No. 9,898,905), all of which are entitled "APPARATUS AND METHOD FOR A BALCONY ACCESS STATUS ALERT SYSTEM" and all of whose entire disclosures are incorporated by reference herein.

BACKGROUND OF THE INVENTION

The present invention relates in general to safety barriers and, more particularly, to a safety gate used to impede ingress/egress to balconies or other elevated platforms under construction and to automatically text remotely-located authorized personnel when the gate is removed/opened and when it is restored/closed.

During the construction of a structure that may comprise a height from which a person could be injured from a fall, ingress/egress to an unfinished balcony or other elevated platform on an upper story or other elevated level poses a hazard to personnel working on or around that structure. A worker could inadvertently fall through an incomplete portion of the balcony, or fall over its edge if no bannister has been erected along the perimeter of the balcony, etc. Typical precautions that are taken are to place "limit of disturbance" (LOD) mesh at the ingress/egress to the balcony or other elevated platform to warn those in the vicinity that passage through the ingress/egress should be avoided. However, the LOD does not provide any actual "barrier" to prevent passage and someone could easily push aside the LOD and proceed. Furthermore, even if a barrier were erected at the ingress/egress, if someone were successful in removing it, there would be no way to either remind that person to restore the barrier, or if removed illicitly, to alert authorized personnel to its removal and to take immediate action to restore the barrier.

Thus, there remains a need for automated alert system and method that can immediately detect the removal of a barrier, or the opening of a gate, to an ingress/egress of an elevated balcony or other platform and to provide remotely-located authorized personnel with an alert that the barrier has been removed or that the gate has been opened and to continue that alert until the barrier is restored or the gate closed while also providing a "local" alert to personnel in the ingress/egress vicinity of the danger posed by the removed barrier or opened gate. The system and method also needs to provide an automatic indication when the barrier is restored or the gate is closed.

All references cited herein are incorporated herein by reference in their entireties.

BRIEF SUMMARY OF THE INVENTION

A gate status alert system for use at a position adjacent an opening frame to a balcony to alert at least one authorized personnel, remote from the balcony, that a gate has been removed from the position or has been opened is disclosed. The system comprises: the gate that is configured to be installed or removed from the position and is also configured to be opened or closed at the position and wherein the gate is uncoupled to the opening frame when installed, wherein the gate prevents passage of a person through the opening frame; a first detector that transmits a first wireless signal whenever a portion of the gate has been removed from the position, wherein the first detector is associated with a receptacle secured to a floor at the position, wherein the receptacle receives the portion of the gate therein; a second detector that transmits a second wireless signal whenever the gate is opened; a transceiver which receives the first wireless signal or the second wireless signal, and wherein the transceiver transmits a third wireless signal to an on-site controller upon receipt of the first wireless signal or the second wireless signal; and wherein the on-site controller transmits a fourth wireless signal (e.g., text alerts, etc.) to at least one wireless device (e.g., a cellphone, a smartphone, computer tablet, etc.) of the at least one authorized personnel (e.g., an on-site safety manager, superintendent, etc.) indicating that the gate has been removed or opened and the on-site controller transmits a fifth wireless signal to the at least one wireless device of the at least one authorized personnel indicating that the gate has been restored or closed when the on-site controller no longer receives the third wireless signal.

A method for providing a status alert of a gate installed for use at a position adjacent an opening frame to a balcony in order to alert at least one authorized personnel, remote from the balcony, that the gate has been removed from the position or has been opened is disclosed. The method comprises: releasably securing the gate at the position without coupling the gate to the opening frame; detecting the removal of the gate from the position using a first detector which detects that a portion of the gate has been removed from a receptacle that is secured to a floor at the position, or detecting the opening of the gate using a second detector which detects when the gate has been opened, wherein the gate prevents passage of a person through the opening frame when the gate is present and closed at the position; transmitting a first wireless signal from the first detector whenever the first detector has detected removal of the portion of the gate from the position or transmits a second wireless signal from the second detector whenever the second detector has detected the opening of the gate; receiving the first wireless signal or the second wireless signal by a transceiver wherein the transceiver transmits a third wireless signal to an on-site controller; and receiving the third wireless signal by said on-site controller wherein the on-site controller transmits a fourth wireless signal (e.g., text alerts, etc.) to at least one wireless device (e.g., a cellphone, a smartphone, computer tablet, etc.) of the at least one authorized personnel (e.g., an on-site safety manager, superintendent, etc.) indicating that the gate has been removed or has been opened and wherein the on-site controller transmits a fifth wireless signal to said at least one wireless device of the at the least one authorized personnel indicating that the gate has been restored or the gate has been closed when the on-site controller no longer receives the third wireless signal.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 9 is a flow diagram of the operation of the on-site controller of the present invention;

FIG. 10 is a partial view of a display screen view of a wireless device showing the alert signal message and the restored signal message.

DETAILED DESCRIPTION OF THE PREFERRED EMBODIMENTS

Figure 1:
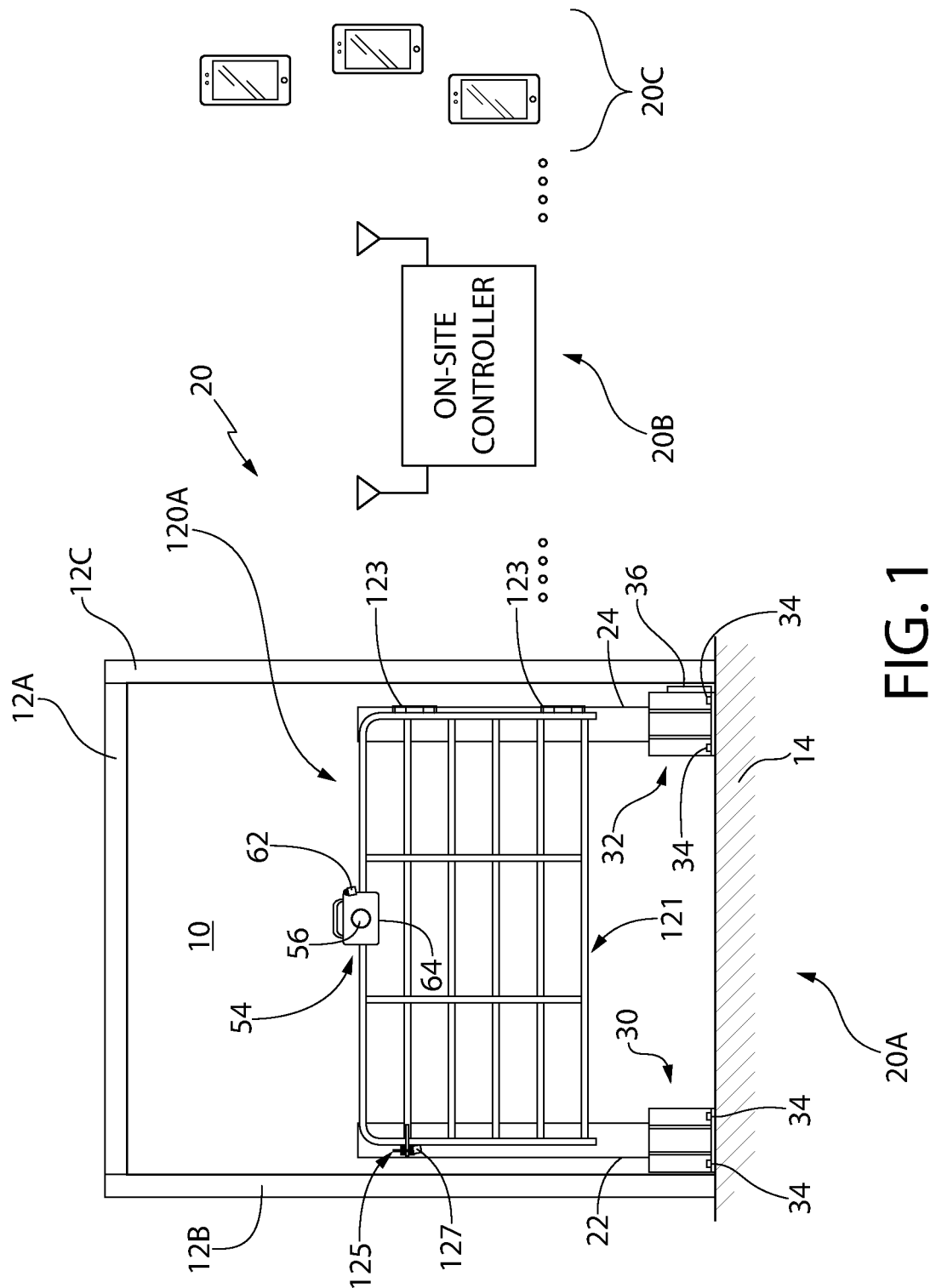
FIG. 1 is a diagram of the system of the balcony access status alert system (BASAS) showing the gate installed in front of the balcony, the onsite controller and the wireless devices of the authorized personnel.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

As shown in FIG. 1, the system and method 20 of the present invention (also referred to as the "balcony access status alert system, BASAS") comprises a gate 120A installed in front of the ingress/egress 10 (hereinafter, "opening 10") to a balcony (or other elevated platform), an on-site controller 20B (e.g., a DMP-XTLC-Wireless Control Panel, etc.) and at least one wireless communication device 20C (e.g., a cellphone, a smartphone, computer tablet, etc.). As will be discussed in detail later, if the gate 120A is ever opened, or removed from its location in front of the balcony opening 10, a wireless signal is transmitted from the gate 120A to the on-site controller 20B which in turn transmits warnings (e.g., text alerts, etc.) to at least one wireless device 20C of at least one authorized person (e.g., an on-site safety manager, superintendent, etc.) to take the appropriate action to close the gate 120A or restore the gate 120A or otherwise coordinate actions to secure the balcony opening 10.

Figure 5A:
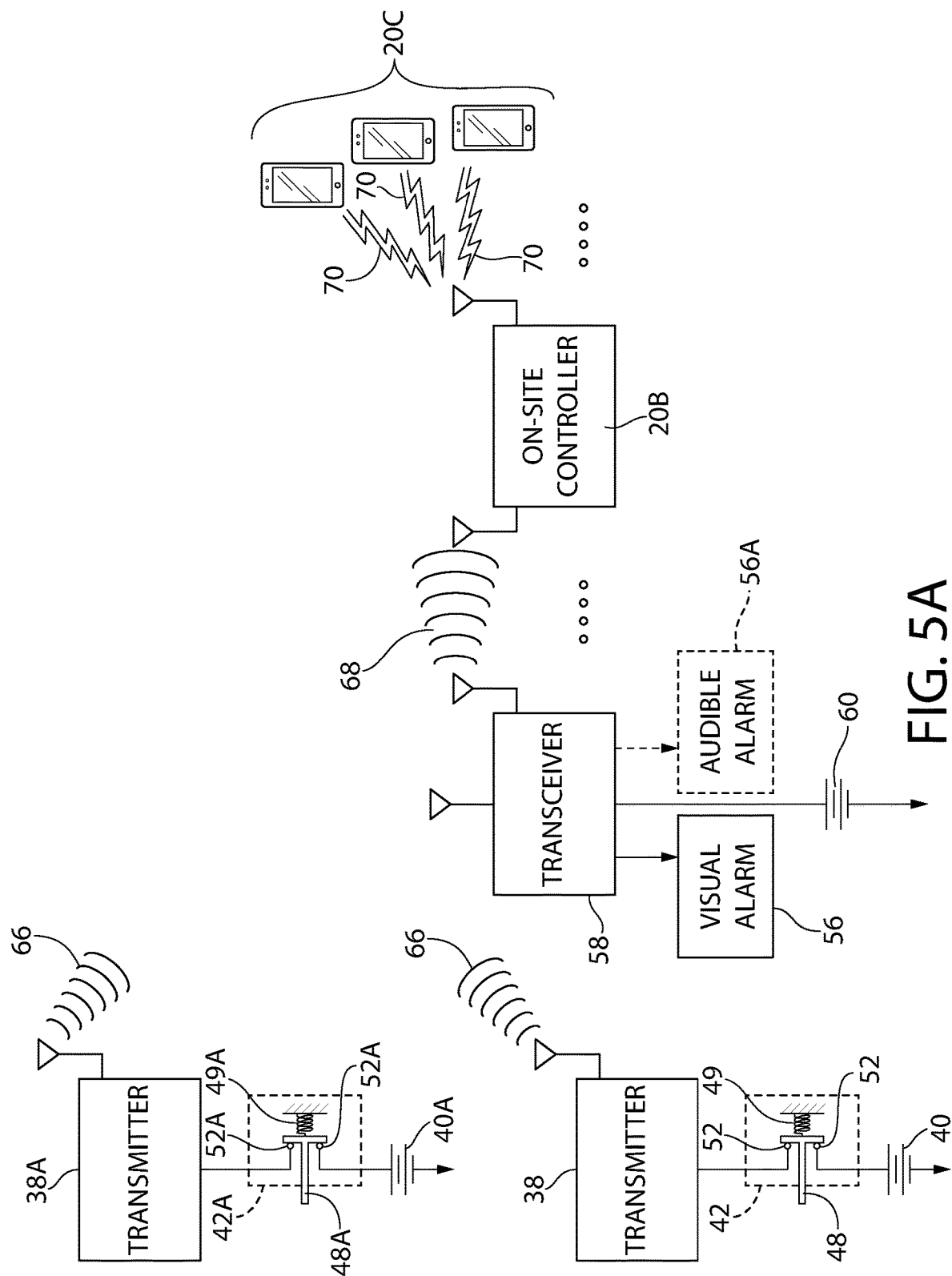
FIG. 5A is a block diagram of the wireless portion of the system of the present invention depicting its operation when the gate posts are removed from their respective boots or the gate is opened.
Figure 5B:
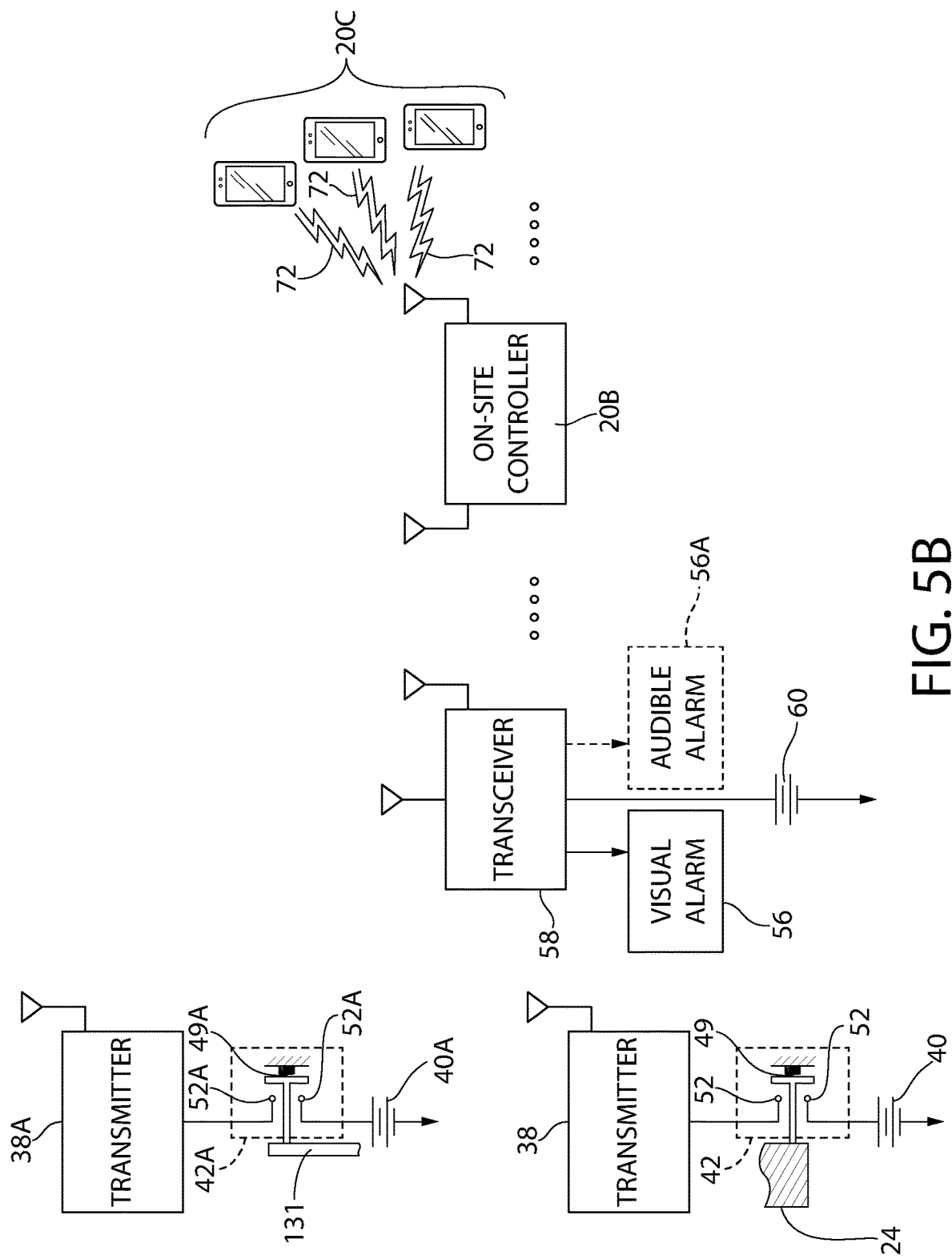
FIG. 5B is a block diagram of the wireless portion of the system of the present invention depicting its operation when the gate posts are restored to their respective boots or the gate is closed.

It should be understood that the term "on-site controller" 20B is a device that is located on a site where construction is on-going but that the controller 20B itself may be located remotely from the actual gate(s) 120A/opening(s) 10, as indicated by the "dots" in FIGS. 1 and 5A-5B. Similarly, "on-site personnel" may be located at the site where construction may be occurring but they also may be remote from the actual gate(s) 120A/opening(s) 10. Thus, by way of example only, construction work may be occurring at particular units in a residential housing facility ("site") that is already occupied; as a result, certain authorized personnel can be present anywhere at the site but remote from any of the gate(s) 120/opening 10 and thus are unaware of the particular status of the gates 120A. The BASAS 20 provides the requisite status automatically to these authorized personnel, as is discussed below.

Furthermore, it should be understood that the following discussion is directed at a single gate 120A/opening 10 but that is by way of example only. A plurality of gates 120A/openings 10 can be monitored by the BASAS 20 of the present invention and each gate 120A has a particular identity that is provided in the signals 70 and 72 as also discussed below.

A balcony opening 10 is typically formed by a frame, e.g., studs 12A-12C and the floor 14. As shown most clearly in FIG. 2, the gate 120A comprises a gate structure 121 (e.g., a "cow gate" such as the Tarter 6 Bar Economy Tube Gate, 6EBL12, by Tractor Supply Co., etc.) of metal bars/struts and wherein one side of the gate 120A is pivotally-coupled (e.g., via hinges 123) to one vertical post 24 (e.g., wood posts, metal posts, etc.) and the other side of the gate 120A can be releasably secured (e.g., using a latch 125 and padlock 127, etc.) to another vertical post 22 (e.g., wood posts, metal posts, etc.) to close the gate 120A. By way of example only, the latch 125 may comprise a self-locking gate latch assembly (e.g., Self-locking gate latch—post mount automatic gravity lever wood fence gate latches by Nidaye, or by Zoro Select or National Hardware N184-861 Universal Automatic Gate Latch, etc.) which can then be locked with the padlock 127. Moreover, where wooden posts are used for the vertical posts 22/24, tamper-proof fasteners (e.g., Lobe pan head screws ("star-shaped" socket)), etc.) are preferred to deter others from easily disengaging the gate structure 121 (e.g., attempting to disengage the hinges 123, or the latch assembly 125, etc.) from the vertical posts 22/24 to enter the balcony opening 10. The bottom of each vertical post 22/24 is received in a respective receptacle 30 and 32 (e.g., an Occupational Safety and Health Act (OSHA) safety boot SB001) and each of which are fixedly secured to the floor 14 using lag bolts (two of which 34 are shown in FIG. 1), directly in front of the balcony opening 10. These receptacles 30/32 are positioned close to the studs 12B and 12C so as to position the gate 120A close to the opening 10 in order to prevent someone from trying to "squeeze" behind the gate 120A and go through the balcony opening 10. In view of the foregoing, the term "gate 120A" includes the gate structure 121 and the vertical posts 22/24.

By way of example only, the gate 120A may comprise a 6-foot wide gate with a height of 4 feet.

Although not shown, the gate structure 121 may include extensions, on each end, that may project away therefrom, towards the opening frame studs 12B and 12C, respectively. This would facilitate in further deterring someone from attempting to "squeeze" behind the gate 120A and go through the balcony opening 10.

Figure 11:
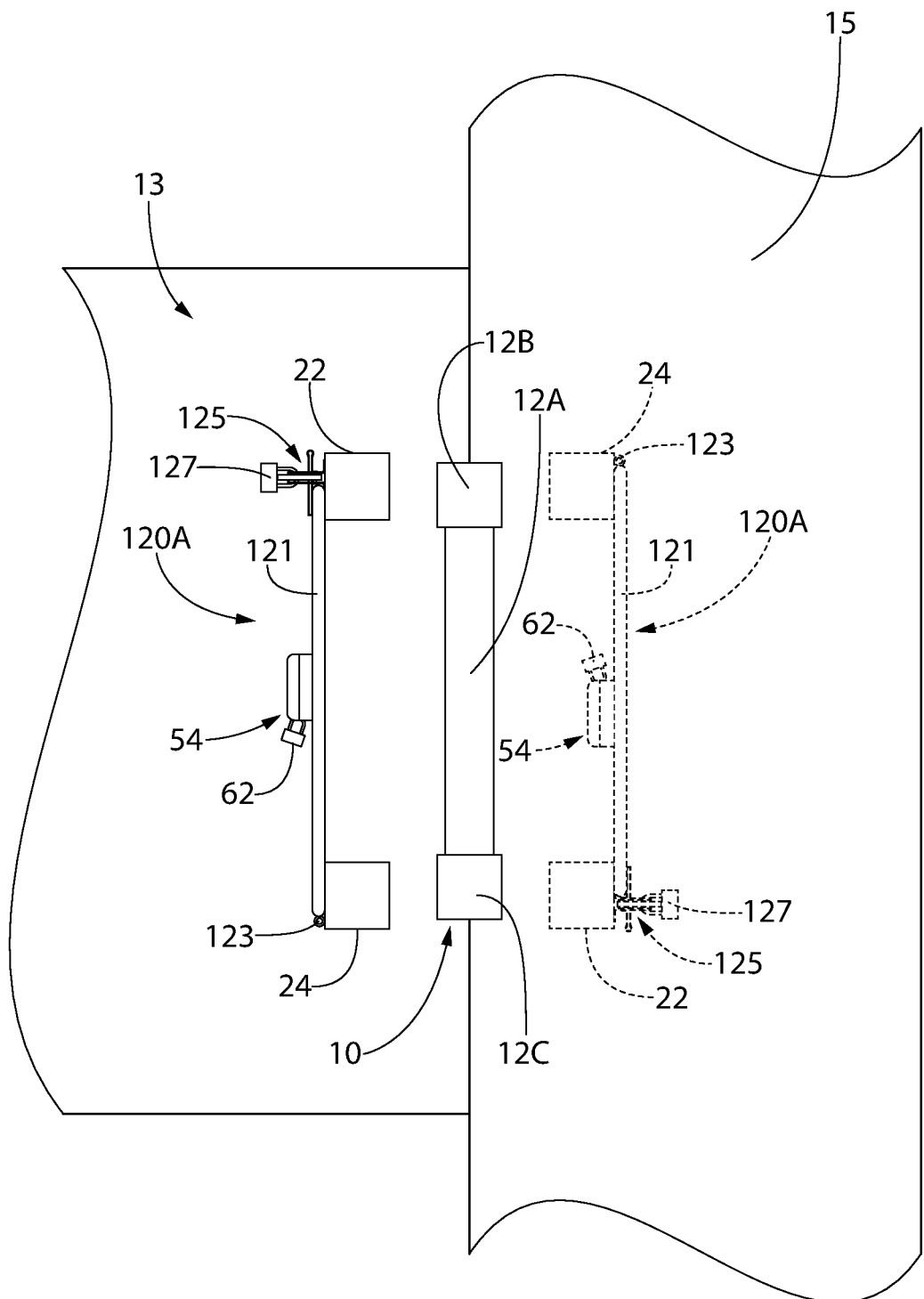
FIG. 11 is a top view functional diagram showing alternative positions of the gate portion of the present invention.

FIG. 11 shows alternative positions of the gate 120A. In particular, the gate 120A is positioned inside the upper level structure 13 (e.g., an upper level room, etc.) at the balcony opening 10, adjacent the frame. Alternatively, the gate 120A can also be positioned outside the upper level structure, on the balcony 15 itself, adjacent the frame, as shown in phantom. As such, the floor 14 (FIG. 1) represents the floor 14 in the upper level structure or the floor of the balcony 15.

Figure 3:
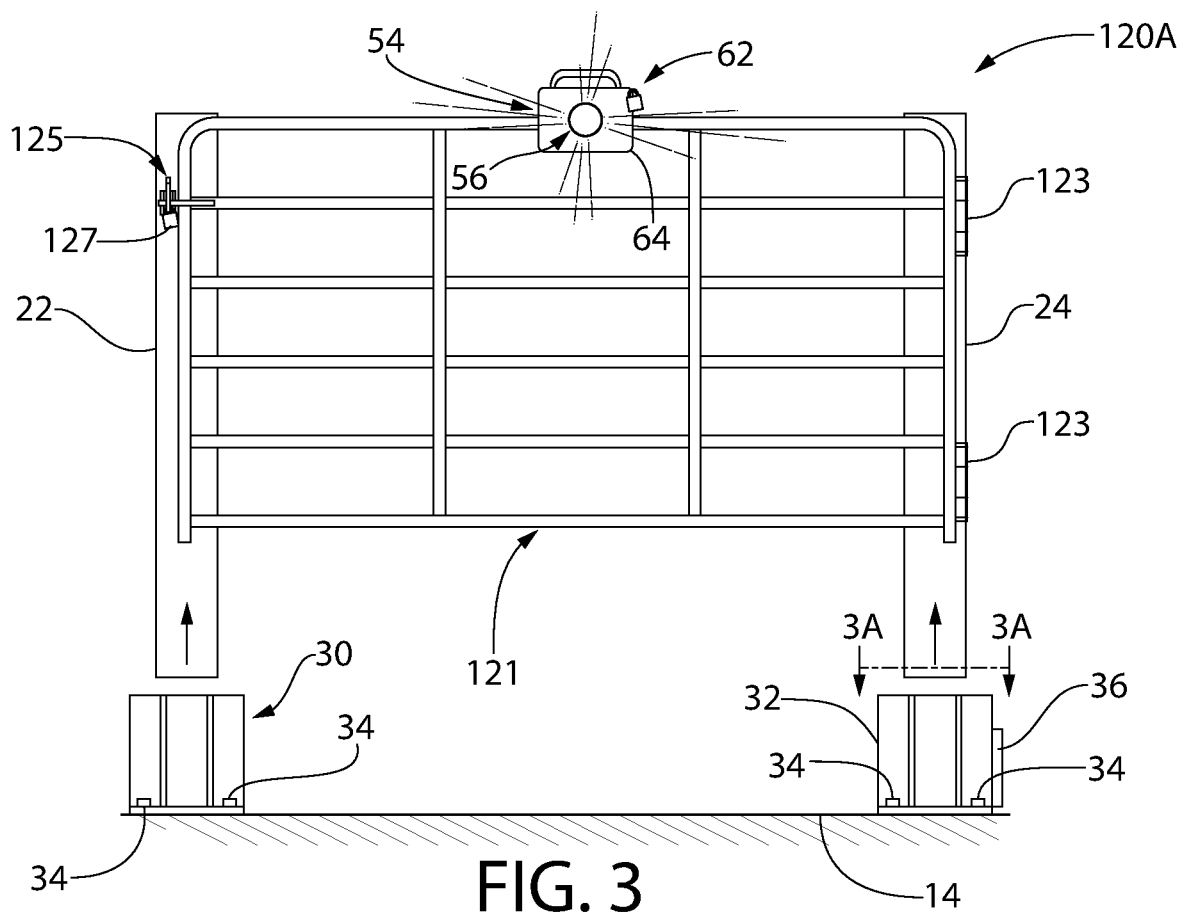
FIG. 3 shows the gate portion of the system being removed from the respective boots.
Figure 4:
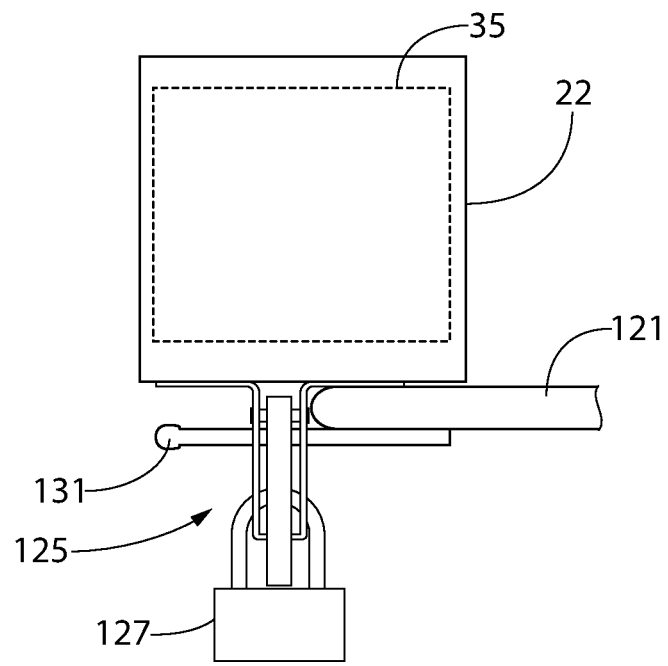
FIG. 4 is partial top view of the gate and vertical post and showing an exemplary latch device for releasably securing the gate in a closed position.

As will be discussed in detail later, there are two actions that are detected by the system and method 20 of the BASAS. The first action is the removal of the gate 120A from the receptacles 30 and/or 32 (FIG. 3). The second action is the opening of the gate 120A, e.g., by unlatching it from the vertical post 22 and then swinging it open (FIG. 4B). Either of these actions will cause the BASAS to send the alerts as discussed in detail below. Removal of the gate 120A as opposed to simply opening the gate 120A may be necessary when large equipment or other needs require a wider pathway onto or from the balcony 15 (FIG. 11).

Removal/Restoration of the Gate 120A

Figure 2:
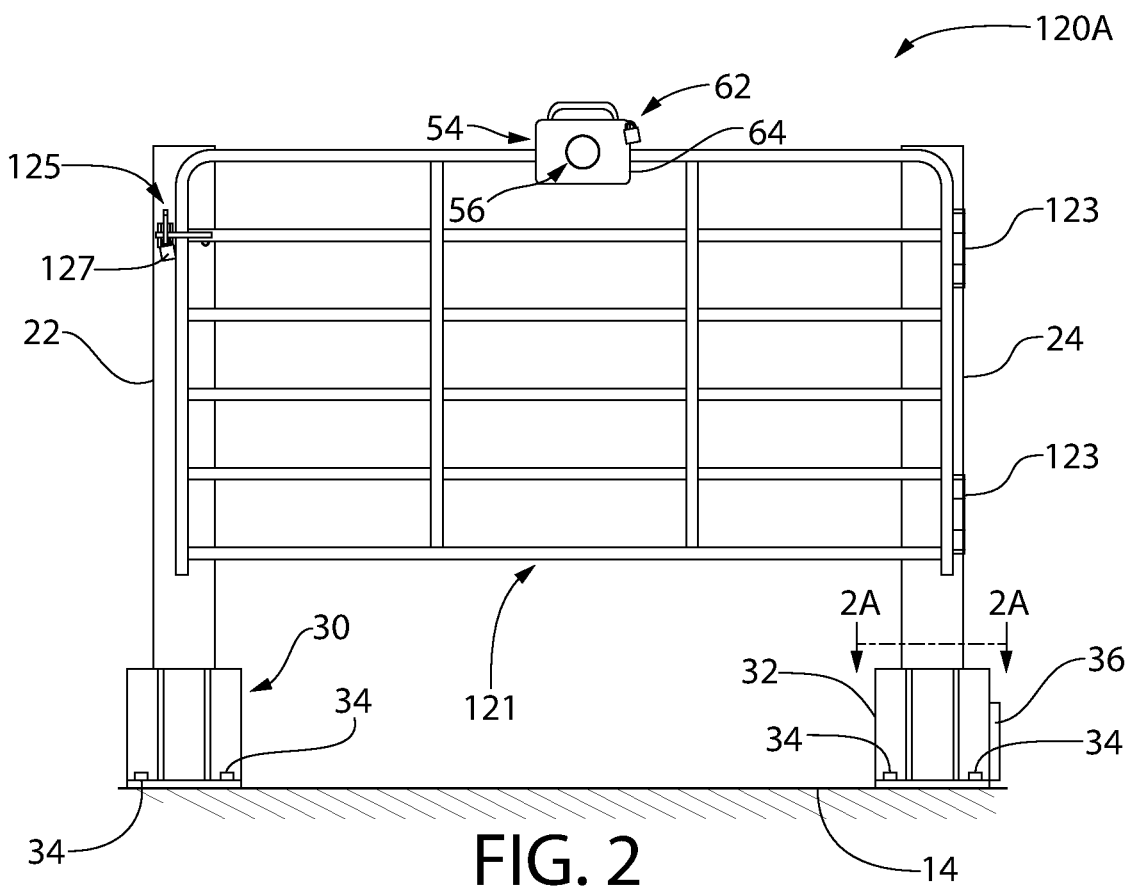
FIG. 2 is a plan view of the gate portion of the BASAS positioned in its receptacles and with the gate portion shown closed.
Figure 2A:
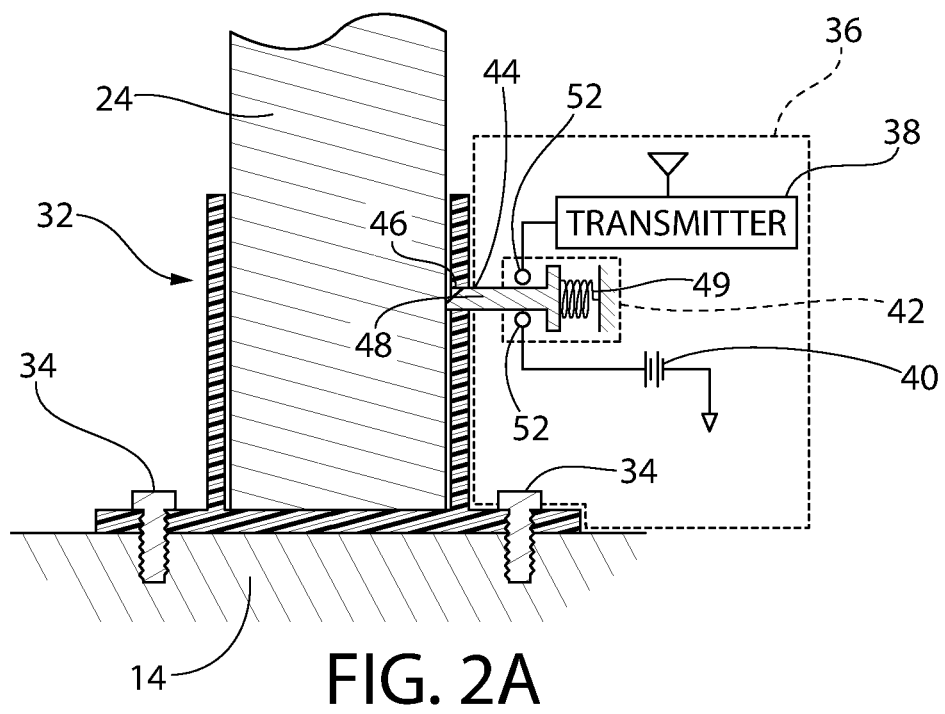
FIG. 2A is a functional diagram showing how the presence of the gate post, shown partially, in the corresponding boot maintains the first transmitter inactive.
Figure 3A:
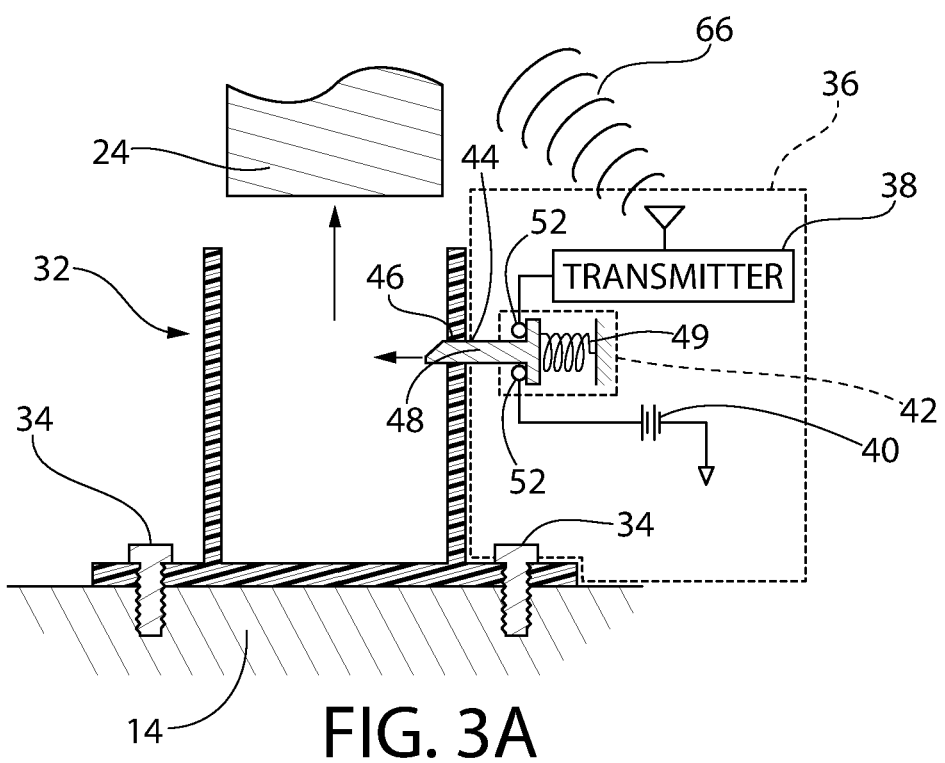
FIG. 3A is a functional diagram showing how the removal of the gate post, shown partially, from the corresponding boot activates the first transmitter.

By way of example only, a housing 36 is provided in the receptacle 32, it being understood that this housing 36 can just as easily be provided in the receptacle 30. As shown most clearly in FIG. 2A, the housing 36 comprises a transmitter 38 (e.g., DMP-1101 or DMP 1106 wireless input transmitter, etc.), a battery 40 (e.g., 3 VDC lithium battery) and a switch 42 electrically connected between the transmitter 38 and the battery 40. The housing 36 comprises an aperture 44 which aligns with an aperture 46 in the receptacle 32 through which projects a conductive switch element 48 that is biased (via a spring 49) to close contacts 52 when the bottom of the post 24 is removed from the receptacle (see FIG. 3A) and to activate the transmitter 38 to transmit a wireless signal 66 (FIGS. 3A-4). As shown in FIG. 2A, with the bottom of the post 24 inserted within the receptacle 32, the conductive switch element 48 is displaced away from contacts 52 and the transmitter 38 is thus de-energized. As such, the transmitter 38/switch 42 form a detector which determines when the gate 120A has been removed or restored. With that said, it should be understood that it is within the broadest scope of the present invention 20 to include various types of detection schemes (e.g., proximity switches, magnetic coupling, electrical field disturbance, photoelectric detection, etc.) for detecting the removal/restoration of the gate 120A and that the transmitter 38/switch 42 configuration disclosed herein is by way of example only.

Figure 6:
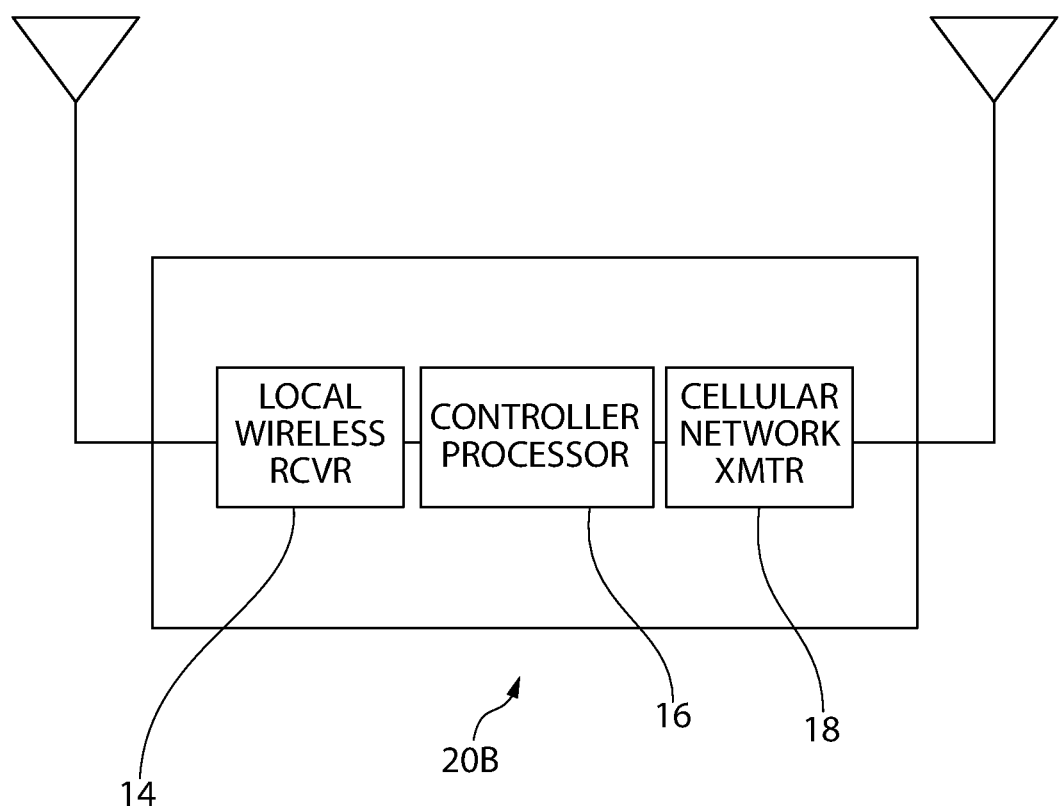
FIG. 6 is a block diagram of the on-site controller of the present invention.
Figure 7A:
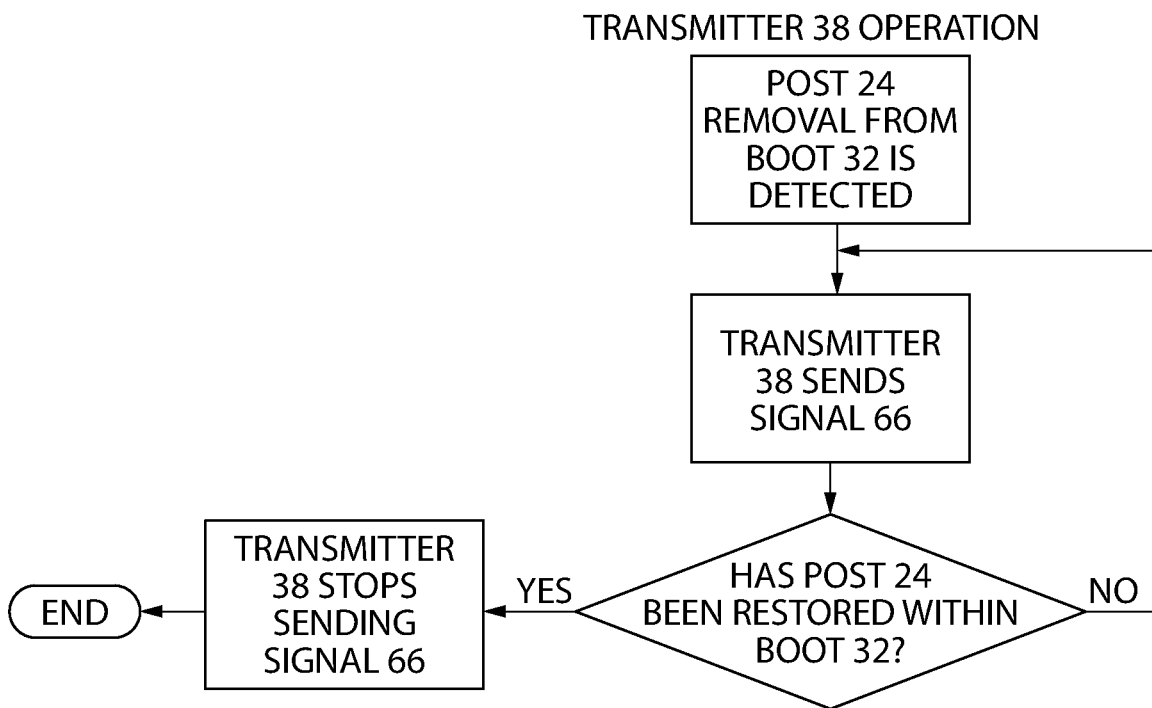
FIG. 7A is a flow diagram of the operation of the first transmitter of the present invention.
Figure 8:
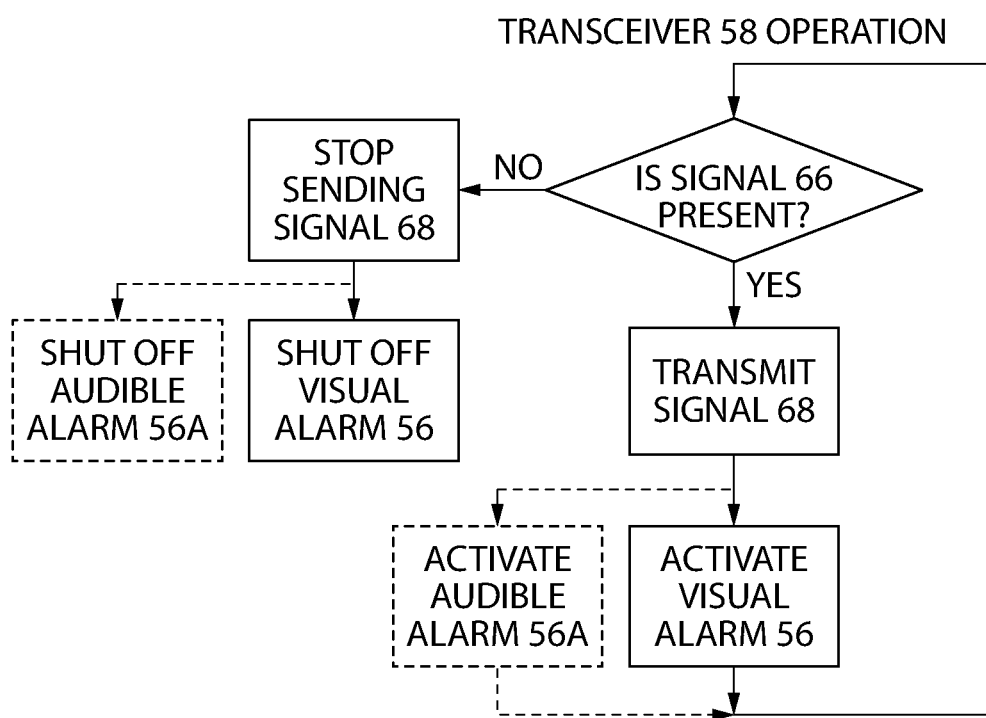
FIG. 8 is a flow diagram of the operation of the transceiver of the present invention.

By way of example only, another housing 54 (e.g., a casing having a lid that can be locked, e.g., SE300 protective casing by Seahorse Protective Equipment of LaVerne, Calif.) is provided on gate structure 121, it being understood that the housing 54 could just as easily be positioned on some other portion of the gate 120A. The housing 54 comprises a visual indicator/alarm 56 (e.g., a warning light such as a SECO-LARM SL-1301-BAQ LED strobe light, etc.; or alternatively, or in addition to, an audible indicator/alarm 56A (FIG. 4, e.g., Piezo buzzer-fast pulse tone, etc.)), a transceiver 58 (e.g., DMP-1116 wireless relay output control, etc.) and a battery 60 (FIGS. 5A-5B, e.g., Yuasa NP7-12/12V, 7.0 AH, lead acid battery, etc.). A padlock 62 is provided to lock the door 64 to the housing 54 to prevent tampering with the transceiver 58/battery 60/visual indicator 56; only authorized personnel have the key to unlock the padlock 62. The transceiver 58 is coupled to the battery 60 and is always listening to see if it receives a transmission from the transmitter 38. If someone were to remove the gate 120A from the receptacles 30/32, as shown in FIG. 3, the transmitter 38 will transmit a wireless signal 66, as shown in FIG. 3A, and the transceiver 58 (in the housing 56) will receive the wireless signal 66. At that time, the transceiver 58 will activate (see FIG. 3) the visual indicator 56 (and/or the audible alarm 56A) to provide a "local" alert to those in the near vicinity that the gate 120A has been removed. Simultaneously, the transceiver 58 will transmit its own wireless signal 68 (FIG. 5A) to the on-site controller 20B (which is also always listening), which, in turn, will transmit alert warnings 70 (e.g., text messages, etc.; see FIG. 10) that a particular gate 120A (e.g., gate "McB4" has been removed to wireless devices 20C of authorized personnel that are on the site and even off the site (if the power range permits). These warning signals 70 may be transmitted continuously, periodically or in any manner that the system operators wish to establish. FIG. 7A depicts a flow diagram of the transmitter 38 operation while FIG. 8 depicts the transceiver 58 operation. FIG. 9 depicts the on-site controller processor 16 (FIG. 6) operation.

Upon receiving these warning signals 70, these authorized personnel can then take appropriate action to secure the balcony opening 10. Certainly, contractors authorized to work on the balcony may be permitted to remove the gate 120A, or simply open the gate 120A (as is discussed later), to conduct appropriate work at the balcony location, in which case the authorized personnel are aware that the gate 120A has been removed or opened for valid reasons. However, the alert warnings 70 will continue to the authorized personnel until the gate 120A is actually restored (as shown in FIGS. 2-2A) or the gate 120A is closed (FIG. 2). As shown in FIG. 5B, once the post 24 is restored in the boot 32, in that instance, the transmitter 38 stops sending its signal 66, which causes the transceiver 58 to deactivate the visual alarm 56 (and/or audible alarm 56A), while terminating its own transmitted signal 68. Once the on-site controller 20B no longer receives the signal 68, the on-site controller 20B issues a "restored gate or closed gate" signal 72, as shown in FIGS. 5B and 10 (viz., "system ready" indication). Again, this "restored gate or closed gate" signal 72 can be sent continuously, periodically or in any manner desired by the system operator while the post 24 remains in the boot 32 or while the gate 120A is closed.

FIG. 10 depicts an exemplary wireless device 20C screen display of a typical BASAS 20 operation. As shown, a particular gate 120A (identified as "McB4") has been removed from its boots 30/32, thereby alerting the wireless device 20C of this authorized person that the gate 120A was removed at 1:02 pm. Two minutes later (by way of example only) another alert message 70 indicates that the gate 120A system ready message 72 is sent, indicating that the gate 120A (viz., "McB4") has been restored or the gate 120A has been closed. As mentioned previously, it is up to the system operator to determine how often the alert signal 70 and/or the system ready signal 72 are sent to the authorized personnel. In this example, at 1:34 pm the gate 120A ("McB4") is again removed or opened and the authorized personnel wireless devices 20C are alerted. A "system ready" signal 72 is sent at 6:19 pm to the wireless devices 20C. Again, because the system operator can set the frequency of warning signals 70 and system ready signals 72, this can allow the system operators to avoid nuisance warnings if, for example, the removed gate 120A or opened gate 120A is clearly in everyone's sight and the need to "warn" the authorized personnel of the removed gate 120A or opened gate 120A is not as critical.

To make the removal of the gate 120A from the receptacles 30/32 slightly more difficult, a releasable securing mechanism (e.g., a cotter pin, a tamper-proof threaded fastener, etc.) may be installed through the receptacle 30/post 22 (and/or through receptacle 32/post 24). Thus, to remove the gate 120A, the releasable securing mechanism would need to be disengaged first before removing the gate 120A.

As mentioned previously, the on-site controller 20B may comprise a DMP-XTLC-Wireless Control Panel, by way of example only. As shown in FIG. 5, the DMP-XTLC-Wireless Control Panel comprises a local wireless receiver 14, a controller processor 16 and a cellular network transmitter 18 (e.g., CDMA cellular compatible configuration and frequency band(s)) the latter of which permits messaging features (e.g., the messages 70 and 72) with the wireless communication devices 20C (e.g., cell phone), as well as the capability (e.g., a keypad/display, not shown) for authorized system operators to control the frequency of messages 70 and 72, as described previously. The on-site controller 20B is housed in a rugged casing (not shown).

The transmitter 38 and the transceiver 58 may operate in the 905-924 MHz or 2.4 GHz frequency bands (and preferably using spread spectrum techniques) for providing reliable transmissions 66 and 68.

Opening/Closing of the Gate 120A

Figure 4A:
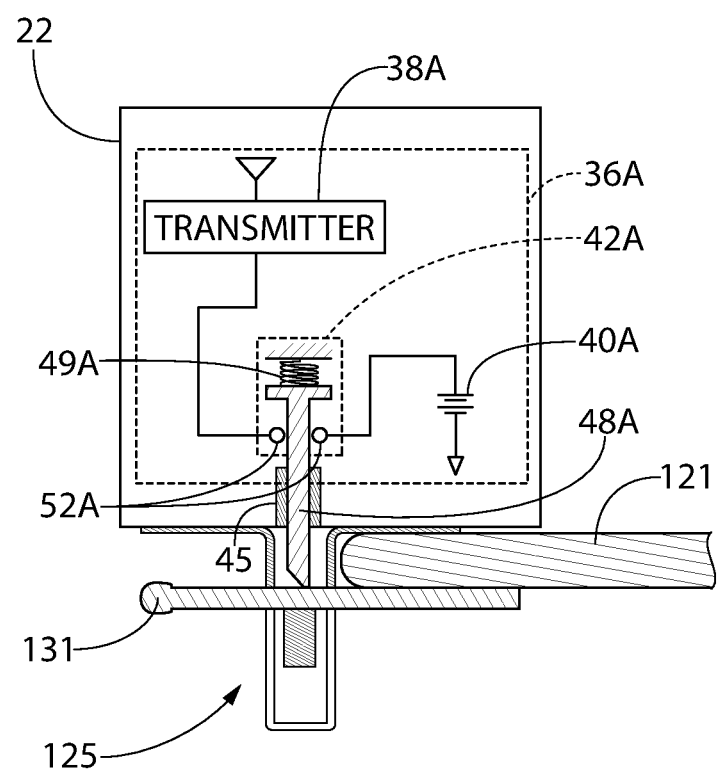
FIG. 4A is a functional diagram showing how the gate, shown partially, in a closed condition maintains the second transmitter inactive.
Figure 4B:
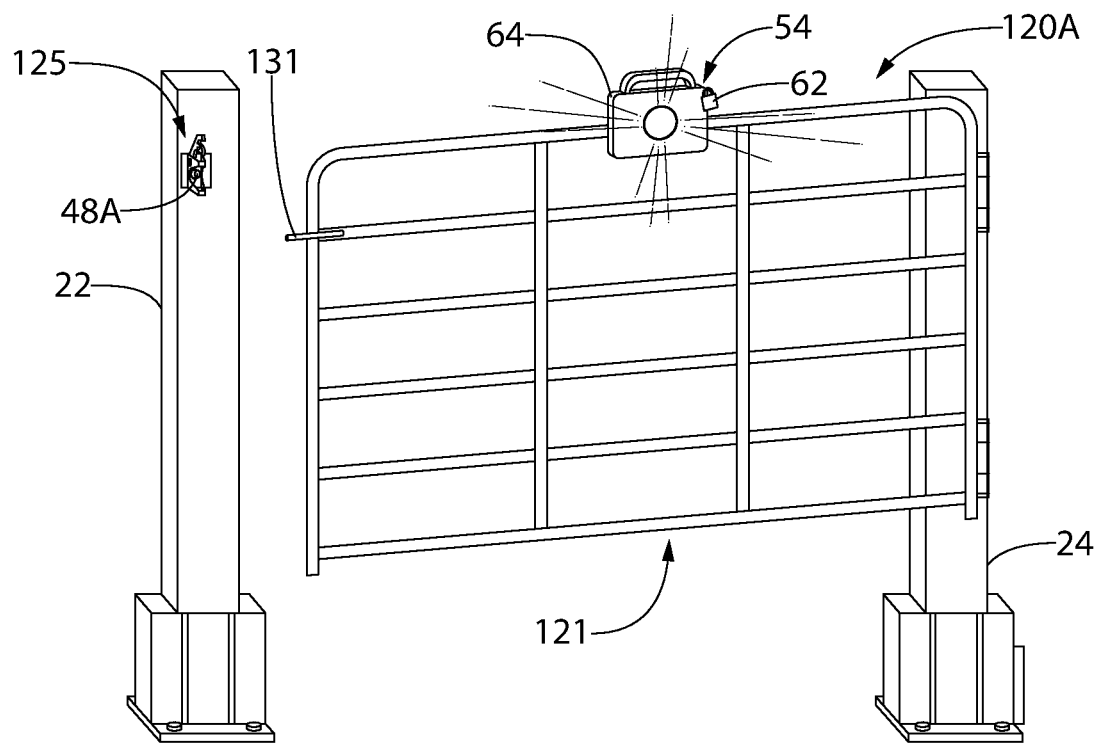
FIG. 4B shows the gate portion of the system in an open condition.

Just as the removal and restoration of the gate 120A is monitored by a detector (see FIG. 2A), so too is the opening and closing of the gate 120A monitored by a second detector (see FIG. 4A). It should be noted, as stated earlier, that these detectors are by way of example only, and that it is within the broadest scope of the present invention 20 to include various types of detection schemes (e.g., proximity switches, magnetic coupling, electrical field disturbance, photoelectric detection, etc.) for detecting not only the removal/restoration of the gate 120A but also the opening/closing of the gate 120A. Thus, the detector of FIG. 2A is referred to hereinafter as the "first detector" and the detector of FIG. 4A is referred to hereinafter as the "second detector."

Figure 4C:
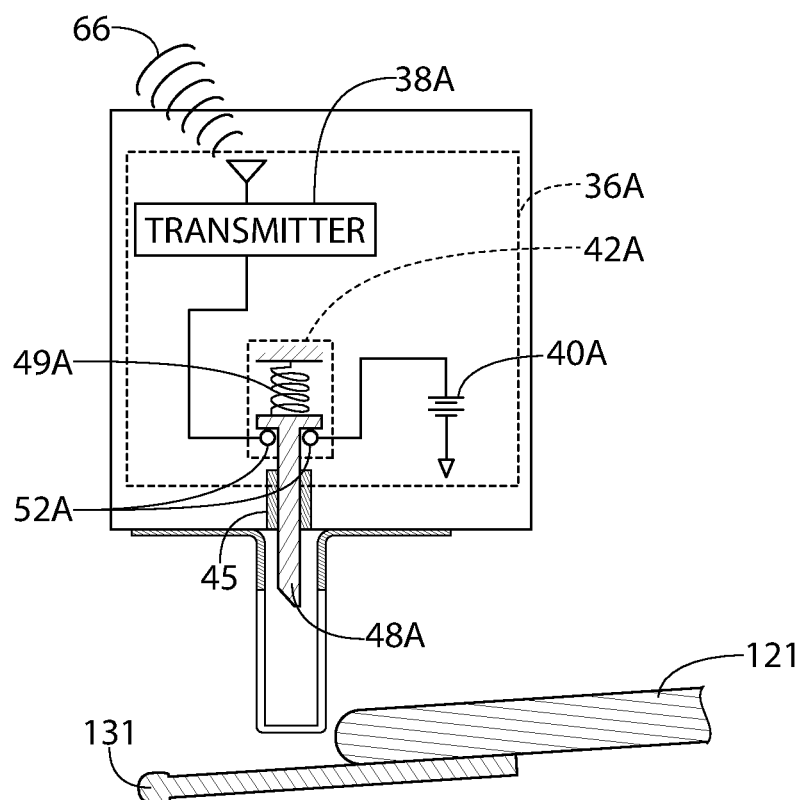
FIG. 4C is a functional diagram showing how the opening of the gate, shown partially, activates the second transmitter.
Figure 7B:
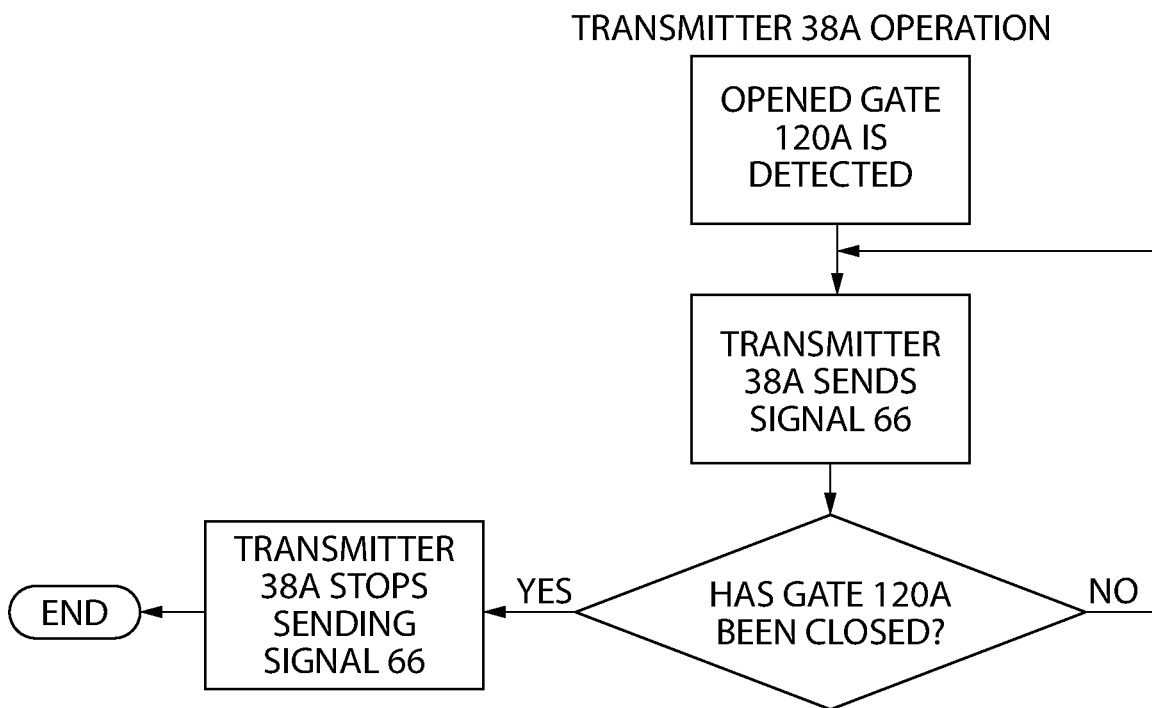
FIG. 7B is a flow diagram of the operation of the second transmitter of the present invention.

As such, the second detector shown in FIG. 4A is also exemplary and operates in a manner similar to the first detector. In particular, when the gate 120A is opened, the second detector activates a second transmitter 38A to transmit the signal 66 to the transceiver 58 (FIG. 5A) and when the gate 120A is closed, the second detector no longer transmits the signal 66, as shown in FIG. 5B. Since both detectors use respective transmitters (viz., transmitter 38 for the first detector and transmitter 38A for the second detector), the term "first transmitter" corresponds to transmitter 38 and the term "second transmitter" corresponds to transmitter 38A. Moreover, the components in both detectors are identical and the reference numbers using the letter "A" in the second detector correspond numerically to the reference numbers in the first detector without the letter "A". By way of example only, the second detector is contained within a housing 36A (FIGS. 4A and 4C) that can be positioned within a cavity 35 (FIG. 4) at the top of the vertical post 22. As shown most clearly in FIG. 4A, the housing 36A comprises the second transmitter 38A (e.g., DMP-1101 or DMP 1106 wireless input transmitter, etc.), a battery 40A (e.g., 3 VDC lithium battery) and a switch 42A electrically connected between the second transmitter 38A and the battery 40A. The housing 36A also comprises a guide 45 through which projects a conductive switch element 48A that is biased (via a spring 49A) to close contacts 52A when the gate structure 121 is moved away from the vertical post 22 to open the gate 120A and thereby to activate the transmitter 38A to transmit the wireless signal 66 (FIGS. 4B-4C). If someone were to open the gate 120A by unlatching it, as shown in FIG. 4B, the second transmitter 38A will transmit a wireless signal 66, as shown in FIG. 4C, and the transceiver 58 (in the housing 56) will receive the wireless signal 66. At that time, the transceiver 58 will activate (see FIG. 4B) the visual indicator 56 (and/or the audible alarm 56A) to provide a "local" alert to those in the near vicinity that the gate 120A has been opened. Simultaneously, the transceiver 58 will transmit its own wireless signal 68 (FIG. 5A) to the on-site controller 20B (which is also always listening), which, in turn, will transmit alert warnings 70 (e.g., text messages, etc.; see FIG. 10) that a particular gate 120A (e.g., gate "McB4" has been opened to wireless devices 20C of authorized personnel that are on the site and even off the site (if the power range permits). These warning signals 70 may be transmitted continuously, periodically or in any manner that the system operators wish to establish. FIG. 7B depicts a flow diagram of the second transmitter 38A operation while FIG. 8 depicts the transceiver 58 operation. FIG. 9 depicts the on-site controller processor 16 (FIG. 6) operation.

Conversely, as shown in FIG. 4A, with the gate structure 121 closed against the vertical post 22, the conductive switch element 48A is displaced away from contacts 52A and the second transmitter 38A is thus de-energized and the system status is shown in FIG. 5B.

If the gate 120A is installed on the balcony 15 (see phantom gate 120A in FIG. 11) rather than on the upper level structure 13, it is preferable that the housing 54 containing the visual indicator 56 be mounted on the inside of the gate 120A to provide a local warning to personnel inside the upper level structure 13.

All other operations of the on-site controller 20B and receipt of the particular text messages by the wireless devices 20C are identical, as previously described in the "Removal/Restoration of the Gate 120A" section of this Specification.

While the invention has been described in detail and with reference to specific examples thereof, it will be apparent to one skilled in the art that various changes and modifications can be made therein without departing from the spirit and scope thereof.

What is claimed is:

1. A method for providing a status alert of a gate installed for use at a position adjacent an opening frame to a balcony in order to alert at least one authorized personnel, remote from the balcony, that the gate has been removed from the position or has been opened, said method comprising:

releasably securing the gate at the position without coupling said gate to the opening frame, said gate comprising a pair of posts that are received in corresponding receptacles secured to a floor and wherein said gate is hingedly mounted to one of said posts along a first gate side and wherein a second gate side, opposite said first gate side, can be opened or closed by a latch secured to said other one of said posts, said opened second gate side defining a gate open condition and said closed second gate side defining a gate closed condition;

providing a first detector at one of said receptacles for detecting the removal of a portion of said corresponding post therefrom;

providing a second detector at said latch, said second detector detecting the said gate open condition, said gate preventing passage of a person through the opening frame when the gate is present at the position and in said gate closed condition;

transmitting a first wireless signal from said first detector whenever said first detector has detected removal of said portion of said corresponding post or transmitting a second wireless signal from said second detector whenever said second detector has detected the gate open condition;

receiving said first wireless signal or said second wireless signal by a transceiver wherein said transceiver transmits a third wireless signal to an on-site controller; and receiving said third wireless signal by said on-site controller wherein said on-site controller transmits a fourth wireless signal to at least one wireless device of the at least one authorized personnel indicating that said portion has been removed or said gate open condition has occurred and wherein said on-site controller transmits a fifth wireless signal to said at least one wireless device of the at the least one authorized personnel indicating that said portion has been restored or said gate closed condition has occurred when said on-site controller no longer receives said third wireless signal.

2. The method of claim 1 wherein said at least one wireless device is a smartphone and wherein said fourth wireless signal is a text message alerting the at least one authorized personnel that said portion has been removed or said gate open condition has occurred.

3. The method of claim 1 wherein said at least one wireless device is a smartphone and wherein said fifth wireless signal is a text message alerting the at least one authorized personnel that said portion has been restored or said gate closed condition has occurred.

4. The method of claim 1 wherein said transceiver is positioned on said gate.

5. The method of claim 1 wherein said step of transmitting the third wireless signal comprises activating an indicator, associated with said gate, by said transceiver when said transceiver transmits said third wireless signal, said indicator activation alerting personnel in a local vicinity when said portion has been removed or when said gate opened condition occurred.

6. The method of claim 5 wherein said step of activating said indicator comprises activating a visual indicator.

7. The method of claim 5 wherein said step of activating said indicator comprises activating an audible indicator.

8. The method of claim 1 wherein a frequency of the transmission of said fourth and fifth wireless signals is configured to be altered.

9. The method of claim 1 wherein said position adjacent the opening frame is inside an upper level structure.

10. The method of claim 1 wherein said position adjacent the opening frame is on the balcony.

* * * * *